(12) United States Patent
Muyldermans et al.

(10) Patent No.: US 8,008,398 B2
(45) Date of Patent: Aug. 30, 2011

(54) FOAMABLE POLYMERIC COMPOSITIONS AND ARTICLES CONTAINING FOAMED COMPOSITIONS

(75) Inventors: Xavier Muyldermans, Ottignies Louvain-La-Neuve (BE); Emmanuelle Coignoul, Ottignies Louvain-La-Neuve (BE)

(73) Assignee: Kraton Polymers U.S. LLC, Houston, TX (US)

( * ) Notice: Subject to any disclaimer, the term of this patent is extended or adjusted under 35 U.S.C. 154(b) by 699 days.

(21) Appl. No.: 10/589,705

(22) PCT Filed: Sep. 3, 2004

(86) PCT No.: PCT/EP2004/052025
§ 371 (c)(1),
(2), (4) Date: Feb. 12, 2007

(87) PCT Pub. No.: WO2006/024329
PCT Pub. Date: Mar. 9, 2006

(65) Prior Publication Data
US 2007/0155846 A1      Jul. 5, 2007

(51) Int. Cl.
C08L 53/00 (2006.01)
C08L 47/00 (2006.01)
C08J 9/00 (2006.01)
B22C 1/22 (2006.01)

(52) U.S. Cl. .......... 525/89; 521/134; 521/139; 521/140; 525/98; 525/240

(58) Field of Classification Search .................. 521/134, 521/139, 140, 54; 525/89, 98, 240
See application file for complete search history.

(56) References Cited

U.S. PATENT DOCUMENTS

| | | | |
|---|---|---|---|
| 3,113,986 A | 12/1963 | Breslow et al. | |
| 3,231,635 A | 1/1966 | Holden et al. | |
| 3,251,905 A | 5/1966 | Zelinski et al. | |
| 3,390,207 A | 6/1968 | Dudley et al. | |
| RE27,145 E | 6/1971 | Jones | |
| 3,598,887 A | 8/1971 | Darcy et al. | |
| 3,634,549 A | 1/1972 | Shaw et al. | |
| 3,670,054 A | 6/1972 | De La Mare et al. | |
| 3,700,633 A | 10/1972 | Wald et al. | |
| 3,865,776 A * | 2/1975 | Gergen | 524/505 |
| 4,219,627 A | 8/1980 | Halasa et al. | |
| 4,226,952 A | 10/1980 | Halasa et al. | |
| 4,677,133 A | 6/1987 | Leicht | |
| 4,764,535 A * | 8/1988 | Leicht | 521/51 |
| 4,880,878 A * | 11/1989 | Himes et al. | 525/89 |
| 5,039,755 A | 8/1991 | Chamberlain et al. | |
| 5,272,182 A * | 12/1993 | Burnell | 521/85 |
| 5,358,783 A * | 10/1994 | Diehl et al. | 428/344 |
| 6,127,444 A | 10/2000 | Kadri | |
| 6,221,964 B1 | 4/2001 | Brzoskowski et al. | |
| 2002/0077425 A1* | 6/2002 | Kawano et al. | 525/232 |
| 2004/0143061 A1* | 7/2004 | Nakagawa et al. | 525/88 |

FOREIGN PATENT DOCUMENTS

| | | |
|---|---|---|
| EP | 0 387 671 A1 | 3/1990 |
| EP | 0 413 294 A1 | 8/1990 |
| EP | 0 636 654 A1 | 7/1994 |
| EP | 0 875 526 A1 | 4/1998 |
| EP | 1 491 578 A1 | 6/2003 |
| IT | 1 317 261 | 4/2000 |
| WO | 94/22931 | 10/1994 |
| WO | 00/26103 | 5/2000 |
| WO | 01/02263 A1 | 1/2001 |

OTHER PUBLICATIONS

U.S. Appl. No. 10/589,705_Moplen C30G_Kolarik et al, Polymer, 47, 2006, 346-356.*

* cited by examiner

*Primary Examiner* — Vasu Jagannathan
*Assistant Examiner* — Irina Krylova
(74) *Attorney, Agent, or Firm* — Clements/Bernard; Michael A. Masse

(57) ABSTRACT

Foamable compositions which are usable for the manufacture of foamed, flexible, heat resistant, thermoplastic elastomeric articles, and which comprises at least:
(a) 100 pbw of one or more selectively hydrogenated block copolymers,
(b) 5 to 50 pbw per 100 pbw of component (a) of one or more different selectively hydrogenated block copolymers,
(c) 42 to 80 pbw per 100 pbw of component (a) of a linear crystalline polymer comprising propylene as the major component,
(d) from 100 to 250 pbw per 100 pbw of component (a) of a softener compatible with blocks B and B', and
(e) from 0.01 to 3 wt. %, relative to the weight of the primary components (a) to (e) of a solid chemical nucleating agent of the endothermic group in combination with a blowing agent.

13 Claims, No Drawings

FOAMABLE POLYMERIC COMPOSITIONS AND ARTICLES CONTAINING FOAMED COMPOSITIONS

This application is a 371 National Stage Application of International Application PCT/EP2004/052025, filed Sep. 3, 2004, the disclosure of which is incorporated herein by reference in its entirety.

TECHNICAL FIELD

The present invention relates to a foamable composition, i.e. a polymeric composition that can be used to produce a foamed composition. The present invention further relates to a pre-blend comprising at least two of the constituents of the polymeric composition and articles containing the foamed composition.

BACKGROUND ART

Foamed polymeric compositions are well known in the art and are being used widely in industry for a variety of purposes.

Although compositions comprising selectively hydrogenated block copolymers of monovinyl aromatic hydrocarbon and conjugated diene have shown interesting properties, it has appeared that the until now available foamed compositions did not meet the present combination of required properties which are necessary for the efficient manufacture of modern foamed articles, e.g. foamed weather seal articles for automotives, ships, aircrafts and the like. The presently required properties include a foam density in the range of from 0.3 to 0.8 $10^3$ kg/m$^3$ and preferably from 0.4 to 0.6 $10^3$ kg/m$^3$; a reduction of foam density in the range of from 25% to 70%, and preferably in the range of from 33% to 55%; a Shore A hardness <70 and preferably <65, and a compression set at 100° C. of below 70% and preferably below 55%, (measured on a non-foamed injection moulded test plate, 6 mm thickness).

It has been found that relatively high molecular weight, selectively hydrogenated block copolymers of monovinyl aromatic hydrocarbon and conjugated diene, i.e. having a total molecular weight of at least 350,000, were only foamable to acceptable density reductions when combined with an oil and large amounts of a polyolefin, which caused the final articles to show a too high hardness.

On the other hand it has been found that relatively low molecular weight selectively hydrogenated block copolymers of monovinyl aromatic hydrocarbon and conjugated diene, i.e. having a molecular weight of up to 180,000, could be foamed with smaller amounts of or even without polyolefin. However, an important drawback of said foamed compositions was the bad heat resistance.

It was also known from e.g. U.S. Pat. No. 6,221,964 to manufacture foamed compositions, comprising thermoplastic vulcanizates, which had been mechanically foamed with water or other physical blowing agents.

In general, said foamed compositions had been derived from EPDM, polyolefin and more in particular polypropylenes and oil, by mixing in an extruder with a cross linking agent as main component.

A known disadvantage of said foamed compositions derived from thermoplastic vulcanizates was that they were rather hygroscopic and showed an unattractive balance between water absorption and tear resistance. They therefore could not be applied as weather seal articles.

From U.S. Pat. No. 4,764,535 and U.S. Pat. No. 4,677,133 elastomer compositions were known which could be foamed into elastomeric cellular products. The elastomeric compositions comprised a mixture of two thermoplastic rubber compounds, a nucleating agent for enhancing the hydrophilic structure, an unstable detackifying resin and optionally polybutene and/or amorphous polypropylene. However, the final properties of the foamed articles could not meet the present requirements and in particular the heat resistance appeared to be insufficient.

From EP 0875526 A elastic foams were known which were prepared from a reprocessable blend of a thermoplastic vulcanizate and an elastic thermoplastic polymer, comprising either one block copolymer, having 2 or more poly(styrene) blocks or poly(substituted styrene) blocks per polymer molecule, or a polymer having at least 40 wt % repeat units from ethylene, or combinations thereof. From the tables it was clear that compositions comprising selectively hydrogenated block copolymers, having poly(styrene) blocks and poly(butadiene) or poly(isoprene) blocks before hydrogenation, could not be foamed with water. On the other hand it appeared that compositions comprising similar unhydrogenated block copolymers could not meet the heat resistance and UV resistance requirements.

From U.S. Pat. No. 6,127,444 a polymeric compound is known comprising (a) 100 parts by weight of a block copolymer comprising at least two external monovinyl aromatic hydrocarbon blocks and at least one internal hydrogenated conjugated diene block, wherein the total monovinyl aromatic hydrocarbon content is from 20 to 50% by weight and the total apparent molecular weight is from 140,000 g/mol to 400,000 g/mol; (b) 50 to 250 phr of a plasticiser (c) 10 to 100 phr of a polybutene 1 polymer having a melt index at 2.16 kg/190 DEG C. of from 0.05 to 400; (d) a blowing agent. That invention further relates to use of the compound for the preparation of foamed compounds; to a foaming process; to a masterbatch blend; to a foamed compound; and to articles containing the foamed compound. The final properties of foamed articles derived from said compositions, have appeared to be unable to meet the present combination of requirements, and in particular the heat resistance.

From IT 1317261 a process was known for the manufacture of elastomeric foam and the manufacture of stoppers and corks, by mixing at 1 6-2MO° C. a first component, comprising one or more thermoplastic elastomers, a plastomer and plasticizers, with a second component, comprising an elastomer containing at least one blowing agent, followed by compression moulding at 180-210° C. The blowing agent was neat or modified azodicarbonamide or mixtures of NaHCO$_3$ and citric acid. The elastomers were styrene-ethylene-butylene copolymer (SEBS), styrene-ethylene-propylene copolymer (SEPS or SEEPS) or styrene-butadiene (SBS). The plastomer was selected from polypropylene, propylene copolymers, ethylene-vinyl acetate copolymer or LDPE. The plasticizer was mineral oil. The moulded products had a Shore A hardness of from 65-95. However, such foamed compositions appeared unable to withstand mechanical stresses at temperatures above 70° and were shown to be too hard when used for e.g. weatherstrips.

Similar products are known from WO 0102263, which provides a synthetic bottle stopper made from a foamed thermoplastic elastomer composition comprising: a) one or more thermoplastic block copolymers c) a blowing agent, and optionally d) one or more plasticisers, characterised in that the composition further comprises b) one or more branched polyolefins having a melt flow index of from 0.05 to 400 (at 2.16 kg/190 DEG C., determined in accordance with ASTIVD 1238).

From WO 0026103 an easily removable synthetic closure is known that is suitable for removable insertion into a bottle or container. In one embodiment, the synthetic closure comprises a thermoplastic elastomer and a metallocene catalyzed ethylene/alpha-olefin copolymer. In another embodiment, the synthetic closure is made from a composition formulated from the ingredients comprising: a thermoplastic elastomer that comprises a styrenic block copolymer; an ethylene/alpha-olefin copolymer; a polypropylene polymer; and a blowing agent; and wherein the closure has a Shore A hardness ranging from 60 to 84. The synthetic closure may further comprise an extending oil and/or a processing additive. In alternative embodiments the compositions suitable for forming the synthetic closures of the present invention optionally include thermoplastic elastomer materials such as, for example, thermoplastic polyurethane elastomers (i.e., TPUs), polyolefin-based thermoplastic elastomers (i.e., TPOs), thermoplastic elastomers based on dynamically vulcanized elastomer-thermoplastic blends (i.e., TPVs), thermoplastic polyether ester elastomers, thermoplastic elastomers based on halogen-containing polyolefins, and thermoplastic elastomers based on polyamides.

It will be appreciated that there is still a growing need for thermoplastic foamable compositions which can be efficiently processed into flexible, heat resistant, closed cell extruded articles of difficult sophisticated profiles, wherein the foamed material has a regular cell structure in all directions and without any substantial scrap material. Accordingly, it is an object of the present invention to provide an improved soft, low density thermoplastic elastomeric foam, which shows moreover an attractive compression set and water absorption, as specified herein before.

As result of extensive research and experimentation such foamable compositions aimed at have now surprisingly been found.

DISCLOSURE OF THE INVENTION

Accordingly the present invention relates to foamable compositions which are usable for the manufacture of foamed, flexible, heat resistant, thermoplastic elastomeric articles, and which comprise at least:
(a) 100 parts by weight of one ore more selectively hydrogenated block copolymers, having at least two resinous blocks A of non-hydrogenated predominantly polymerized monovinyl arene, and a selectively hydrogenated elastomeric block B, wherein said block B prior to hydrogenation being predominantly a polymerized conjugated diene or dienes, said block copolymer having a total apparent molecular weight of at least 250 kg/mole and preferably at least 350 kg/mole, and containing polymerized monovinyl arene blocks of true molecular weight of at least 18 kg/mole,
(b) 5 to 50, preferably from 5 to 40 parts by weight of one or more selectively hydrogenated block copolymers having at least two resinous blocks A' of non-hydrogenated predominantly polymerized monovinyl arene, and an selectively hydrogenated elastomeric block B', wherein said block B' prior to hydrogenation has been derived from a polymerized conjugated diene or dienes as a major component which may be mixed with minor proportions of other copolymers (e.g. vinyl aromatic) i.e. $\leq 25$ wt %, and said block copolymer having a total apparent molecular weight in the range of from 50 to 180 kg/mole, while the resinous blocks A' shown an true molecular weight in the range of from 3 to 20 kg/mole and preferably from 5 to 15 kg/mole,
(c) from 25 to 80 parts by weight of a linear crystalline polymer comprising propylene as major component, with a Vicat softening temperature in the range of from 130° C. to 180° C. and a MFR in the range of from 0.5 to 30 dg/min and a polydisperity index of at least 4.5,
(d) from 100 to 250 parts by weight of a softener compatible with blocks B and B',
(e) from 0.01 to 3 wt %, relative to the weight of the primary components (a) up to (e) of a solid chemical nucleating agent of the endothermic group, in combination with a blowing agent, and optionally
(f) one or more secondary components selected from PPO and or any resins compatible with block copolymer component (a), antioxidants, UV-stabilizers, flame retardants, surface modifying agents and inorganic fillers.

In addition the present invention also relates to foamed articles, derived from the hereinbefore specified foamable compositions, to a foaming process using said hereinbefore specified foamable compositions and to pre-blends comprising at least the component (a) and one or more of (c) and (d), or comprising component (b) optionally combined with (c) and/or (d). Secondary ingredients should be included in pre-blends comprising component (a).

MODE(S) FOR CARRYING OUT THE INVENTION

The preferred block copolymer structure of the components (a) and (b) can have the general formulae

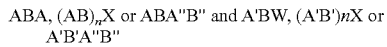

respectively, wherein A, A' and A" represent a poly(monovinyl arene) block and B, B' and B" represent a hydrogenated poly(conjugated diene(s)) block, wherein n is an integer $\geq 2$ and wherein X is the remainder of a coupling agent.

It will be appreciated that the blocks A, A' and A" are different from each other, in that the blocks A are larger than the blocks A', which are in turn larger than A", while the blocks B, B' an B" may be the same or different. Preferably the blocks B and B' will be larger than B" or equal.

A more preferred block copolymer component (a) has the formula ABA or $(AB)_nX$, has a total apparent molecular weight in the range of from 250 to 600 kg/mole, while the poly(monovinyl arene) block content in said block copolymer (a) is in the range of from 20 to 35 wt %.

The monovinyl aromatic monomer is typically selected from styrene, $C_1$-$C_4$ alkylstyrene and $C_1$-$C_4$ dialkylstyrene, in particular styrene, α-methylstyrene, o-methylstyrene, or p-methylstyrene, 1,3-dimethylstyrene, p-tert.-butylstyrene or mixtures thereof, most preferably styrene.

The conjugated diene monomer is typically a conjugated diene monomer containing from 4 to 8 carbon atoms, such as 1,3-butadiene, 2-methyl-1,-3 butadiene (isoprene), 2,3-dimethyl-1,3-butadiene or mixtures thereof, preferably butadiene and/or isoprene and most preferably butadiene.

Most preferred block copolymers ABA comprise substantially pure poly(styrene) blocks, each having a true molecular weight in the range of from 25 kg/mole to 60 kg/mole.

More preferred block copolymer component (b) has the formula A'B'A' or (A'B')nX, and has a total apparent molecular weight in the range of from 80 to 160 kg/mole.

Most preferred block copolymers A'B'A' or (A'B')nX comprise substantially pure poly(styrene) blocks, each having a true molecular weight in the range of from 5 to 15 kg/mole.

A preferred weight ratio between the block copolymer components (a) and (b) is in the range from 10 to 40 parts by weight of component (b) per 100 parts by weight of component (a).

It will be appreciated that the presence of two block copolymer components, having a high and a low molecular weight respectively, and their specified mutual weight ratios are critical. It has been found that if no high molecular weight block copolymer is present in the composition or only in proportions below the specified range, an inferior (too high) compression set and inferior foam stabilisation will occur. If no low molecular weight block copolymer is present in the composition or only in proportions below the specified range, bad foam densities have been found due to wrong flow and/or bad hardness (too rigid foams).

The block copolymer components (a) and (b) can each individually be prepared by sequential polymerization of the respective batches and selective hydrogenation of B, B' or B" blocks in the obtained block copolymer, or by initial preparation of e.g. a living diblock AB precursor which can be coupled with a coupling agent into A-B-A or $(AB)_nX$ block copolymers, which can be subsequently selectively hydrogenated.

The block copolymers (a) and (b) may each, for example, be prepared by coupling at least two diblock copolymer molecules AB or A'B' respectively together. As the coupling efficiency is not 100%, the block copolymer (a) will contain uncoupled diblock copolymer. The block copolymer components (a) and (b) may however also each consist of a blend of block copolymers, one being a diblock copolymer.

As examples of the coupling agent may be mentioned tin coupling agents such as tin dichloride, monomethyltin dichloride, dimethyltin dichloride, monoethyltin dichloride, diethyltin dichloride, methyltin trichloride, monobutyltin dichloride, dibutyltin dibromide, monohexyltin dichloride and tin tetrachloride; halogenated silicon coupling agents such as dichlorosilane, monomethyldichlorosilane, dimethyldichlorosilane, diethyidichlorosilane, monobutyldichlorosilane, dibutyidichlorosilane, monohexyldichlorosilane, dihexyldichlorosilane, dibromosilane, monomethyldibromosilane, dimethyidibromosilane, silicon tetrachloride and silicon tetrabromide; alkoxysilanes and alkylalkoxysilanes such as tetramethoxysilane and methyltrimethoxysilane; divinyl aromatic compounds such as divinylbenzene en divinyl naphthalene; halogenated alkanes such as dichloroethane, dibromoethane, methylene chloride dibromomethane, dichloropropane, dibromopropane, chloroform, trichloroethane, trichloropropane and tribromopropane; halogenated aromatic compounds such as dibromobenzene; epoxy compounds such as the diglycidyl ether of bisphenol-A (e.g. EPON™ 825 or 826), and other coupling agents such as benzoic esters, $CO_2$, 2-chloroprene and 1 chloro-1,3-butadiene.

Of these EPON™ 825 or 826 diglycidyl ether, dibromobenzene, tetramethoxysilane and dimethyldichlorosilane are preferred.

The block copolymer components (a) and (b) to be used in the compound of the present invention may be prepared by any method known in the art including the well known full sequential polymerization method, optionally in combination with re-initiation, and the coupling method, as illustrated in e.g. U.S. Pat. No. 3,231,635; U.S. Pat. No. 3,251,905; U.S. Pat. No. 3,390,207; U.S. Pat. No. 3,598,887; and U.S. Pat. No. 4,219,627 and EP 0413294 A; EP 0387671 A; EP 0636654 A and WO 9422931.

Anionic polymerization of the butadiene or similar conjugated diene results in the incorporation of residual unsaturation in the polymer backbone (1,4-addition) or attached to the polymer backbone (1,2-respectively 3,4-addition) creating short branches generally referred to as vinyl groups. The degree of 1,2-addition (3,4-addition) may be controlled with structure modifiers such as diethyl ether or ethylglyme (1,2-diethoxyethane). As described in US RE27145E which is incorporated by reference herein, the elastomeric properties of hydrogenated block copolymers require some degree of short branching. Indeed, excellent elastomeric properties upon hydrogenation may be found for polymers having a content of 1,2-addition (3,4-addition) of the conjugated diene of 30 mole % or more (based on the conjugated diene. For instance, a 1,2-addition of 78% (within the scope of this invention) is achieved during polymerization by the presence of about 300 ppm of 1,2-diethoxypropane (DEP) in the final solution.

It will be appreciated that independently of the monomer and the modification used in all the B blocks (B, B', B"), the ethylene content (which is the hydrogenation result of the conjugated diene added in 1,4-manner) should be lower than 70 wt %.

In general, the polymers useful in this invention may be prepared by contacting the monomer or monomers with an organoalkali metal compound in a suitable solvent at a temperature within the range from −15° C. to 300° C., preferably at a temperature within the range from 0° C. to 10° C. Particularly effective polymerization initiators are organolithium compounds having the general formula RLi wherein R is an aliphatic, cycloaliphatic, alkyl-substituted cycloaliphatic, aromatic or alkyl-substituted aromatic hydrocarbon radical having from 1 to 20 carbon atoms of which sec.butyl is preferred.

Suitable solvents include those useful in the solution polymerization of the polymer and include aliphatic, cycloaliphatic, alkyl-substituted cycloaliphatic, aromatic and alkyl-substituted aromatic hydrocarbons, ethers and mixtures thereof. Suitable solvents, then, include aliphatic hydrocarbons such as butane, pentane, hexane and heptane, cycloaliphatic hydrocarbons such as cyclopentane, cyclohexane and cycloheptane, alkyl-substituted cycloaliphatic hydrocarbons such as methylcyclohexane and methylcycloheptane, aromatic hydrocarbons such as benzene and the alkyl-substituted hydrocarbons such as toluene and xylene, and ethers such as tetrahydrofuran, diethylether and di-n-butyl ether. Preferred solvents are cyclopentane or cyclohexane.

It will be appreciated that the B and B' and/or B" blocks in the finally applied block copolymers preferably have been selectively hydrogenated to a degree of at least 95%, whereas the poly(styrene) blocks have not been hydrogenated or only in a degree of at most 5%.

The hydrogenation of these polymers may be carried out by a variety of well established processes including hydrogenation in the presence of such catalysts as Raney Nickel, noble metals such as platinum and palladium and soluble transition metal catalysts. Suitable hydrogenation processes which can be used are ones wherein the diene-containing polymer or copolymer is dissolved in an inert hydrocarbon diluent such as cyclohexane and hydrogenated by reaction with hydrogen in the presence of a soluble hydrogenation catalyst. Such processes are disclosed in U.S. Pat. Nos. 3,113,986, 4,226,952; 3,634,549; 3,670,054; 3,700,633 and US RE27145E, the disclosure of which are herein incorporated by reference. The polymers are hydrogenated in such a manner as to produce hydrogenated polymers having a residual unsaturation content in polydiene blocks of less than 5 percent by weight, preferably less than 1% wt and more preferably as close to 0 percent as possible, of their original unsaturation content prior to hydrogenation. A titanium catalyst such as disclosed in U.S. Pat. No. 5,039,755, which is herein incorporated by reference, may also be used in the hydrogenation process.

The hydrogenation degree can be analyzed using the Nuclear Magnetic Resonance (NMR) method.

Preferred examples of component (a) is KRATON® G 1651 KRATON G MD 6917 ES, and KRATON G MD 6933 ES block copolymer while a preferred example of component (b) is KRATON G 1650, KRATON G 1657, KRATON G 1652, KRATON3 RP 6924 block copolymer. Most preferred block copolymer (a) is KRATON MD 6933 ES, while the most preferred block copolymers (b) are KRATON G RP 6924 and KRATON G 1657.

The linear crystalline polyolefin (component c) is preferably a single polymer or a mixture of polymers, predominantly composed of propylene monomer or a copolymer of predominantly propylene with a minor proportion of a different alkylene such as ethylene or butylenes, i.e. less than 25 wt % of the monomer mixture.

The preferred polyolefin can be characterized by a MFR between 2 and 15 dg/min at 230° C./2.16 kg (ISO 1133,) a Vicat softening temperature in the range of from 130 to 170° C. kg (ISO 305, condition A50 [50° C., 10N]) and a polydispersity index $\geq 4.5$. Most preferred components (c) show a broad molecular weight distribution, i.e. a polydispersity index $\geq 5$.

The polydispersity index (PI), is defined by Zeichner and Patel and is related to the molecular weight distribution through a strong correlation with Mw/Mn (Zeichner, G. R. and Patel, P. D., Proc. $2^{nd}$ World Congr. Chem. Eng. 6, 373 (1981). For linear polypropylene (PP) the PI equals $10^5$ divided by the cross-over modulus Gc That is determined by means of an isothermal dynamic frequency sweep within the linear viscoelastic region of the molten material.

Examples of said suitable crystalline polypropylenes are MOPLEN™ HP 502 L (having a PI of 5.49) and MOPLEN HP 1078 (having a PI of 5.29) or combinations thereof or combinations thereof with other crystalline polypropylenes.

It will be appreciated that the type of selected polymer for component (c) is rather critical in obtaining desirable foam densities and skin quality. With compositions outside the scope of the present invention, bad (high) foam densities may be found and/or a bad (rough) foam skin quality may be found if the melt temperature as a result of improper conditions is too high. The same is true if the melt viscosity as a result of component (c) is too high, prohibiting proper bubble growth.

A preferred weight ratio of the polyolefin relative to the weight of component (a) is from 42 to 65 parts by weight per 100 parts by weight of component (a).

Component (d) is preferably a paraffinic or naphtenic plasticizer compatible with the B blocks in the block copolymer components that leads to low fogging values.

Examples of said paraffinic plasticizers commonly used include oil, and preferably naphtenic or paraffinic oil and more preferably paraffinic oil. Examples of alternative plasticizers are aliphatic synthetic plasticizers or oligomers of randomly or sequentially polymerized styrene and conjugated diene, oligomers of conjugated diene, such as butadiene or isoprene, liquid polybutene-1, and ethylenepropylene rubber, all having a weight average molecular weight in the range of from 0.3 to 30 kg/mole, preferably from 0.5 to 25 kg/mole and more preferably from 0.5 to 10 kg/mole. A preferred component (d) is PRIMOL™ 352 paraffinic oil.

In previous foaming compositions colloid silicates, carbon black and metal salts of aliphatic acids were used as nucleating agents. They were used in amounts ranging from 0.25 to 5 wt %, relative to the weight of the elastomer composition. The solid chemical nucleating agent (e) is preferably selected from mixtures of $NaHCO_3$ and citric acid or sodium citrate. Preferred amounts of said solid chemical nucleating agent are in the range of from 0.5 to 1 wt %, relative to the weight of the components (a) up to (d).

To obtain regular cell structure, both a nucleating agent as well as a blowing agent should be used. These two components may be combined, e.g., dispersed in a masterbatch based on a poly(olefin), having a low melting point. For instance, HYDROCEROL™ BIH40 is an endothermic chemical blowing agent, releasing $CO_2$ and water, that also acts as a nucleating agent. It has been found now that an attractive regular distribution of entrapped gas could be obtained by the use of small amounts of the hereinbefore specified nucleating agent. The use of the specific combination of ingredients avoids the use of unstable detackifying resin, which was formerly used for obtaining closed, smooth surfaces of foamed articles.

The foamable compositions of the present invention will contain chemical or physical blowing agents in addition to or in combination with the hereinbefore mentioned nucleating agents. In general, blowing agents can be selected from non-toxic physical blowing agents such as $CO_2$, $N_2$ or water, and compounds decomposing above a certain temperature, thereby releasing gas such as nitrogen, carbon dioxide or water, which causes a volume increase of the reaction mass. Carbon dioxide as well as nitrogen are preferred blowing agents.

These blowing agents are used in amounts of from 0.5 to 10 wt %, relative to the weight of the total composition. Of the chemical blowing agents, the preferred blowing agent is HYDROCEROL™ BIH40 (which then also acts as nucleating agent). Alternative but less preferred blowing agents include GENITRON™ PB 10 (releasing nitrogen) and CYLACELL™ (releasing water vapour).

The optional PPO resins if any, are primarily compatible with the block copolymer (a) and can be included in the foamable composition of the present invention in amounts of up to 80 parts by weight of block copolymer component (a) and more preferably in amounts of from 20 to 50 parts by weight per 100 parts by weight of block copolymer (A).

As indicated earlier, the foamable compositions of the present invention may also comprise further secondary components. Such as foaming agents, primary or secondary antioxidants, UV-stabilizers, surface modifying agents like waxes, silicone oils, kemamides, fluor polymers, in amounts known in the art of polymer compositions. Also inorganic fillers like $CaCO_3$, talc, TiCh, carbon black may be included in amounts of up to 100 parts by weight per 100 parts by weight of composition (a). Also water releasing chemical compounds can be used such as metal salts containing hydrate water, metal hydroxides, organic diacids forming anhydrides and mixtures of ingredients which generate water through a polycondensation reaction.

It will be appreciated that the foams according to the present invention show a foam density in the range of from 0.3 to $0.8 \; 10^3$ kg/$m^3$ and preferably from 0.4 to $0.6 \; 10^3$ kg/$m^3$; a reduction of foam density in the range of from 25% to 70%, and preferably in the range of from 33% to 55% and a Shore A hardness <70 and preferably <65 and a compression set at 100° C. of below 70% and preferably below 55%, measured on a non-foamed injection moulded test plate, 6 mm thickness, made from the ingredients (a)-(f) without blowing agent.

It will be appreciated that another aspect of the present invention is formed by pre-blends of the intimately mixed hereinbefore specified components (a), (c) and (d) and of components (b), (c) and/or (d) respectively, optionally mixed with one or more secondary ingredients which can be used for the preparation of complete foamable compositions and foamed articles made thereof. This mixing must be carried out in a co-rotating twin screw extruder.

If a pre-blend composition without blowing agent is produced, the pre-blend can be further blended or tumble mixed with a blowing agent to prepare a masterbatch to be used in the actual foaming process.

If a pre-blend composition with blowing agent(s) is produced, care should be taken that during the blending process the temperature is kept below the blowing agent decomposition temperature, unless full or partial foaming is desired during the pre-blending operation.

Still another aspect of the present invention is formed by foamed flexible weather seal articles, prepared from the hereinbefore specified foamable compositions.

The flexible foamed profiled articles are preferably formed by a process which comprises the following steps:
(i) heating a mixture of the foamable polymeric composition of the present invention, prepared by mixing pre-blends, comprising respectively components (a), (c), and (d) and optionally (f) and components (b), (c) and (d) and the blowing agent to a temperature above the melting point of the thermoplastic elastomer, and
(ii) releasing the resulting mixture to atmospheric conditions.

The foaming process can be performed in any equipment, which is known to be used for foaming of a thermoplastic elastomer.

Preferably an extruder with $L/D \geqq 20$ is used and more preferably an extruder with $L/D \geqq 25$. The extruder should ensure a melt pressure >10 bar and preferably >15 bar before the exit. The temperature reached early in the extruder is above the melting point of the thermoplastic elastomer compositions, preferably $\geqq 200°$ C.

If a chemical blowing agent is used, the temperature inside the extruder should reach at least the decomposition temperature of that chemical blowing agent.

The temperature of the melt should be precisely controlled at the end of the extruder, particularly just before the exit of the die. The melt temperature at the die of the extruder is preferably between 20° C. lower or higher than the Vicat softening temperature of the component (c) used in the compositions. It is most preferably between 5 to 15° C. higher than the Vicat Softening temperature of component (c).

The invention will be elucidated by the following examples, however without restricting its scope to these specific embodiments.

EXAMPLES

Basic components used in the tested foamable compositions have been listed in Table 1.

TABLE 1

| High molecular weight | Component (a) |
|---|---|
| KRATON MD6933ES | Selectively hydrogenated linear block copolymer S-E/B-S having an apparent molecular weight of about 450 kg/mole, a polystyrene content of about 31% wt and a polystyrene block molecular weight of about 46 kg/mole. |
| KRATON MD6917ES | Selectively hydrogenated linear block copolymer S-E/B-S having an apparent molecular weight of about 290 kg/mole, a polystyrene content of about 33% wt. and a polystyrene block molecular weight of about 29 kg/mole. |
| Low molecular weight | Component (b) |
| KRATON G RP6924 | Selectively hydrogenated linear block copolymer S-E/B-S having an apparent molecular weight of about 150 kg/mole, a polystyrene content of about 22% wt., and a polystyrene block molecular weight of about 10 kg/mole |
| KRATON G1657 | Selectively hydrogenated linear block copolymer $(S-E/B)_2$ having an apparent molecular weight of about 145 kg/mole, a polystyrene content of about 13% wt. and a polystyrene block molecular weight of about 5.3 kg/mole. |
| Polyolefin | Component (c) |
| MOPLEN HP501L | Homopolypropylene showing a MFR of 6 at 230° C./2.16 kg, a Vicat softening temperature VST/A50 of 154° C. and a polydispersity index[1] of 4.00. |
| MOPLEN HP502L | Homopolypropylene showing a MFR of 5.5 at 230° C./2.16 kg, a Vicat softening temperature VST/A50 of 153° C. and a polydispersity index of 5.49. |
| MOPLEN HP1078 | Homopolypropylene showing a MFR of 3 at 230° C./2.16 kg, a Vicat softening temperature VST/A50 of 154° C. and a polydispersity index of 5.29. |

TABLE 1-continued

| | |
|---|---|
| MOPLEN F30S | Homopolypropylene showing a MFR of 12 at 230° C./2.16 kg, a Vicat softening temperature VST/A50 of 154° C. and a polydispersity index of 3.97. |
| Plasticizer | Component (d) |
| PRIMOL 352 | Paraffinic oil. |
| Nucleating/blowing agent | Component (e) |
| HYDROCEROL BIH 40 | Nucleating agent in small amounts, and chemical blowing agent in greater amounts: Masterbatch 40% wt of endothermic chemical foaming and nucleating agents based on $NaHCO_3$ - Na Citrate. |
| Nitrogen, $CO_2$ | Physical blowing agents |
| GENITRON PB10 | Exothermic chemical blowing agent of the azodicarbonamide family at 10% concentration in PE |
| CYLACELL | Endothermic chemical blowing agent comprising a mixture of sodium and magnesium silicates with borates and water |
| Others | Component (f) |
| RIGIDEX HD5526EA | High Density PolyEthylene |
| IRGANOX 1010 | Anti-oxidant. |
| IRGANOX PS800 | Anti-oxidant. |

[1]measured as defined by Zeichner and Patel as specified hereinbefore.

The tested foamable compositions presented in the various following tables have been prepared according to the hereinbefore specified process conditions.

Experiment Set 1

The ingredients in Table 2 were intimately mixed in a high shear co-rotating twin-screw extruder to obtain the thermoplastic elastomer compositions A up to F (Comparative Experiments) and G (Experiment according to the invention, but not preferred as dry-blend—see Table 3). The properties, Hardness and Compression Set (CS), were measured on non-foamed injection moulded plates of 6 mm thickness.

The compositions were further dry-blended with 2% wt of a ready-to-use masterbatch of foaming and nucleating agents, here HYDROCEROL BIH 40. These foamable pre-blend compositions were used in a single screw extruder with L/D=20, heated up to 200° C., equipped of a tube die with an external diameter of 8 mm and a wall-die thickness of 0.8 mm, to produced a foamed profile. The die pressure was kept above 25 bar and the melt pressure was controlled to be around 164° C. The foam density was measured on the foamed tube profile.

TABLE 2

| Ingredients in parts: | A | B | C | D | E | F | G |
|---|---|---|---|---|---|---|---|
| (a) MD6933ES | 100 | 100 | 100 | | | | 100 |
| (a) MD6917ES | | | | | | 15 | |
| (b) RP6924 | | | | | | 85 | |
| (b) G1657 | | | | 100 | 100 | | 19 |
| (d) PRIMOL 352 | 100 | 150 | 150 | 50 | 50 | 100 | 160 |
| (c) HP502L (PI = 5, 49) | 30 | 30 | | 30 | | 40 | 52 |
| (c) HP1078 (PI = 5, 29) | | | 30 | | 30 | | |
| (f) IRGANOX 1010 | 0.2 | 0.2 | 0.2 | 0.2 | 0.2 | 0.2 | 0.2 |
| (f) IRGANOX PS800 | 0.2 | 0.2 | 0.2 | 0.2 | 0.2 | 0.2 | 0.2 |
| Properties before foaming: | | | | | | | |
| Hardness 3s Shore A | 54 | 49 | n.m. | | | 48 | 58 |
| Hardness 30s Shore A | 48 | 43 | n.m. | | | 44 | 55 |
| CS 70° C. 72 h, % | 37 | 35 | >70 | | | 88 | 47 |
| CS 85° C. 72 h, % | 41 | 39 | >100 | | | 85 | 49 |
| CS 100° C. 24 h, % | 44 | 47 | >100 | | | 85 | 52 |
| Properties after foaming | | | | | | | |
| Foam density, $10^3$ kg/m$^3$ | 0.72 | 0.76 | n.m. | n.m. | 0.62 | 0.66 | 0.64 |
| Density reduction, % | 24 | 20 | n.m | n.m | 35 | 31 | 33 | n.m. = not measured

This table 2 shows that the presence of both components (a) and (b) in the right ratio is necessary to obtain good properties and good density reduction. The composition C is very close to the composition B and is expected to give similar results. The properties thereof were therefore not determined.

Experiment Set 2

It has been found advantageous to prepare the compositions in multiple steps rather than by blending all components in one step using the twin-screw extruder. Accordingly, in the following examples, the previously mentioned compositions B or C containing component (a), (d) and (f) are dry-blended with compositions D or E containing component (b), (d) and (f); additional component (c), and with 2% wt of HYDROCEROL BIH 40. The pre-blends 1 up to 5 are foamed according to the process described above Experiment set 1.

process (dry-blending of the various compositions for composition 1) gives a higher density reduction than composition G (prepared in one step into the twin-screw extruder). The dry-blend process is then preferred.

It should also be noticed that the example 5 contains a mixture of MOPLEN HP1078 and MOPLEN F30S. This polypropylene mixture has a PI=4.97 and shows good overall properties even though MOPLEN F30S alone has not the required PI (3.97).

Experiment Set 3

The following examples show again the importance of the various ingredients ratio.

In Table 4, a new composition H is presented. This composition was prepared in a co-rotating twin-screw extruder as previously described It contains 100 parts Kraton

TABLE 3

|  | 1 | 2 | 3 | 4 | 5 | G |
|---|---|---|---|---|---|---|
| Composition B | 100 | 100 | | | | |
| Composition C | | | 100 | 100 | 100 | |
| Composition D | 12 | 25 | | | | |
| Composition E | | | 12 | 25 | 12 | |
| Composition G | | | | | | 100 |
| (c) HP502L (PI = 5, 49) | 6 | 5 | | | | |
| (c) F30S (PI = 3, 97) | | | | | 6 | |
| (c) HP1078 (PI = 5, 29) | | | 6 | 5 | | |
| Properties before foaming: | | | | | | |
| Hardness 3s Shore A | 58 | 58 | 59 | 56 | 56 | 58 |
| Hardness 30s Shore A | 55 | 52 | 55 | 52 | 52 | 55 |
| CS 70° C. 72 h | 48 | 48 | 47 | 49 | 47 | 47 |
| CS 85° C. 72 h | 51 | 50 | 50 | 51 | 50 | 49 |
| CS 100° C. 24 h | 51 | 53 | 50 | 50 | 50 | 52 |
| Properties after foaming: | | | | | | |
| Foam density, $10^3$ kg/m$^3$ | 0.60 | 0.59 | 0.5 | 0.55 | 0.56 | 0.64 |
| Density reduction, % | 37 | 38 | 47 | 42 | 41 | 33 |
| Composition in terms of components (in parts) | | | | | | |
| Component (a): | 100 | 100 | 100 | 100 | 100 | 100 |
| Component (b): | 19 | 39 | 19 | 39 | 19 | 19 |
| Component (c): | 52 | 56 | 52 | 56 | 52 | 52 |
| Component (d): | 160 | 170 | 160 | 170 | 160 | 160 |

Examples 1 to 5 are dry-blend compositions according to the invention. Composition 1 and G contains exactly the same amount of the same ingredients, but are prepared by different process steps. It is highlighted in this table that the two steps MD6933ES; 200 parts PRIMOL 352; 50 parts MOPLEN HP502; and 0.2 parts each of IRGANOX 1010 and PS800.

The foamable compositions have all been prepared in the dry-blend process, with 2% wt of HYDROCEROL BIH 40.

TABLE 4

|  | 7 | 8 | 9 | 10 | H | 11 |
|---|---|---|---|---|---|---|
| Composition B | 80 | 50 | 85 | 100 | | |
| Composition F | 20 | 50 | 10 | 25 | | |
| Composition H | | | | | 100 | 100 |
| (c) HP502L (PI = 5, 49) | | | 5 | 5 | | 12.5 |
| Properties before foaming: | | | | | | |
| Hardness 3s Shore A | 49 | 51 | 58 | 57 | 56 | 72 |
| Hardness 30s Shore A | 44 | 46 | 53 | 52 | 50 | 67 |
| CS 70° C. 72 h | 51 | 72 | 48 | 51 | 41 | 50 |
| CS 85° C. 72 h | 51 | 70 | 50 | 53 | 44 | 53 |
| CS 100° C. 24 h | 54 | 72 | 48 | 58 | 53 | 62 |
| Properties after foaming: | | | | | | |
| Foam density, $10^3$ kg/m$^3$ | 0.74 | n.m. | 55 | 0.59 | 0.60 | 0.49 |
| Skin appearance | | | | | No skin | |

TABLE 4-continued

|  | 7 | 8 | 9 | 10 | H | 11 |
|---|---|---|---|---|---|---|
| Density reduction, % | 22 | n.m. | 42 | 38 | 37 | 48 |
| Composition in terms of components (in parts) | | | | | | |
| Component (a): | 100 | 100 | 100 | 100 | 100 | 100 |
| Component (b): | 24 | 84 | 11 | 24 | 0 | 0 |
| Component (c): | 40 | 65 | 51 | 53 | 50 | 94 |
| Component (d): | 172 | 227 | 160 | 172 | 200 | 200 | n.m. = not measured

Composition 7 shows that a too low level of component (c) leads to insufficient density reduction. Composition 8 contains too much component (b) to have acceptable compression set and composition 11 is too hard due to the high level of component (c). Composition H seems to have a good balance of properties but the foamed profile obtained with this composition does not have any skin. This open cell structure is obtained because pre-foaming occurs into the die of the extruder, as the die pressure is too low. Compositions 9 and 10 are examples of right ingredients ratio leading to right balance of properties.

Experiment Set 4

As shown with this series of examples, the choice of the linear crystalline polymer is critical.

The foamable compositions have all been prepared in the dry-blend process, with 2% wt of HYDROCEROL BIH 40.

TABLE 5

|  | 9 | 12 | 13 | 14 |
|---|---|---|---|---|
| Composition B | 85 | 85 | 85 | |
| Composition F | 10 | 10 | 10 | |
| Composition based HDPE (40 parts HDPE per 100 parts of a) | | | | 100 |
| (c) HP502L (PI = 5, 49) | 5 | | | |
| (c) HP1078 (PI = 5, 29) | | 5 | | |
| (c) HP501L (PI = 3. 94) | | | 5 | |
| Properties before foaming: | | | | |
| Hardness 3s Shore A | 58 | 59 | 58 | 60 |
| Hardness 30s Shore A | 53 | 55 | 54 | 54 |
| CS 70° C. 72 h | 48 | 47 | n.m. | 25 |
| CS 85° C. 72 h | 50 | 50 | n.m. | n.m. |
| CS 100° C. 24 h | 48 | 50 | n.m | 35 |
| Properties after foaming: | | | | |
| Foam density, $10^3$ kg/m$^3$ | 0.55 | 0.60 | 0.72 | 0.83 |

TABLE 5-continued

|  | 9 | 12 | 13 | 14 |
|---|---|---|---|---|
| Density reduction, % | 42 | 37 | 24 | 13 |
| Composition in terms of components (in parts) | | | | |
| Component (a): | 100 | 100 | 100 | 100 |
| Component (b): | 11 | 11 | 11 | 0 |
| Component (c): | 51 | 51 | 51 | 0 |
| Component (d): | 160 | 160 | 160 | 150 | n.m. = not measured

Even though a HDPE gives better compression set value, such a polyolefin is not suitable for the production of low density profile.

Among the wide range of homopolypropylene available on the market, only the ones having a large molecular weight distribution (expressed here by the polydispersity index PI) can be used.

Experiment Set 5

This series of experiments shows the importance of the presence of a nucleating and a blowing agent. The choice of the blowing agent plays also a role on the aspect of the final foamed profile. The foamable composition used here have been prepared from 85 parts of Composition B; 10 parts of Composition F; 5 parts of MOPLEN HP502 and various amounts of nucleating agent and/or blowing agent in the dry-blend process. As a result it has (before foaming) the following properties: Hardness 3 s (Shore A) of 58; Hardness 30 s (Shore A) of 53; CS 70° C., 72 h=48; CS 85° C. 72 h=50, and CS 100° C. 72 h=48.

TABLE 6

|  | 9 | 15 | 16 | 17 | 18 | 19 | 20 | 21 |
|---|---|---|---|---|---|---|---|---|
| Nucleating agent: HYDROCEROL BIH 40 (%) | 0.5 | 0.5 | 0.0 | 0.5 | 0.5 | 0.0 | 0.5 | 1.0 |
| Blowing agent: | | | | | | | | |
| HYDROCEROL BIH 40 (%) | 1.5 | | | 0.0 | | | | |
| Gas $CO_2$ | | $CO_2$ | $CO_2$ | | | | | |
| GENITRON PB 10 (%) | | | | | 1.5 | 2 | | |
| CYLACELL (%) | | | | | | | 1.5 | 1.5 |
| Total Nucleating agent (%) | <.8 | <.2 | 0 | <.2 | <.2 | 0 | <.2 | <.4 |
| Sufficient blowing agent | Y | Y | Y | N | Y | Y | Y | Y |
| Properties after foaming: | | | | | | | | |
| Foam density, $10^3$ kg/m$^3$ | 0.55 | 0.35 | 0.48 | 0.75 | 0.62 | 0.58 | 0.62 | 0.59 |
| Density reduction, % | 42 | 63 | 49 | 21 | 35 | 39 | 35 | 38 |

The appearance of the foamed composition is set out in Table 7

TABLE 7

| Composition | Appearance |
|---|---|
| 9 | Smooth |
| 15 | Open skin |
| 16 | No skin, Big bubbles (Very Rough) |
| 17 | Smooth |
| 18 | Bigger bubbles |
| 19 | Not homogeneous (Rough) |
| 20 | Big bubbles |
| 21 | Smooth |

Experiment Set 6

This series of experiments shows the suitability of nitrogen as blowing agent. The foamable compositions used here have been prepared from 100 parts of (a) MD6933; 16 parts of (b) G 165759 parts of (c) HP1078; 158 parts of (d) PRIMOL 352 and 0.2 parts each of IRGANOX 1010 and PS800.

Before foaming, the composition had a Hardness 3 s (Shore A) of 58 and a Compression Set (100° C., 24 h) of 52%, 0.5% of HYDROCEROL BIH40 was used as nucleating agent.

Without any further blowing agent added, a foam density of 0.86 $10^3$ kg/m$^3$ was found (density reduction of 4%; smooth surface appearance). With a further addition of 1.5% HYDROCEROL BIH40 (now also acting as blowing agent), a foam density of 0.64 $10^3$ kg/m$^3$ was found (density reduction of 29%, smooth surface appearance). With addition of 0.06% nitrogen gas, a foam density of 0.58 $10^3$ kg/m$^3$ was found (density reduction of 36%, smooth surface appearance.

For these foams also the water absorption according to the test method ASTM 1056 was determined. The first foam (with no additional blowing agent) had a water absorption of 0%, which is an indication of 100% closed cells. When 1.5% additional HYDROCEROL BIH40 was added, this changed to 9%. With addition of nitrogen gas as blowing agent, this changed to 0.2%. The water absorption is preferably below 10%.

The invention claimed is:

1. Foamable compositions which are usable for the manufacture of foamed, flexible, heat resistant, thermoplastic elastomeric articles, and which comprise at least:
  (a) 100 parts by weight of one or more selectively hydrogenated block copolymers, having at least two resinous blocks A of non-hydrogenated predominantly polymerized monovinyl arene, and a selectively hydrogenated elastomeric block B, wherein said block B prior to hydrogenation being predominantly a polymerized conjugated diene of polybutadiene, said block copolymer having a total apparent molecular weight from 250-600 kg/mole, and containing polymerized monovinyl arene blocks of true molecular weight of from 18 to 60 kg/mole, and said polymerized monovinyl arene content is in the range of from 20 to 35 wt %,
  b) 5 to 50 parts by weight per 100 parts by weight of component (a) of one or more selectively hydrogenated block copolymers having at least two resinous blocks A' of non-hydrogenated predominantly polymerized monovinyl arene, and an selectively hydrogenated elastomeric block B', wherein said block B' prior to hydrogenation has been derived from a polymerized conjugated diene or dienes as a major component which may be mixed with 25 or less wt. % of other copolymers, and said block copolymer having a total apparent molecular weight in the range of from 50 to 180 kg/mole, while the resinous blocks A' shown an true molecular weight in the range of from 3 to 20 kg/mole,
  c) from 42 to 80 parts by weight per 100 parts by weight of component (a) of a linear crystalline polymer comprising propylene as major component, with a Vicat softening temperature in the range of from 130° C. to 180° C. and a MFR in the range of from 0.5 to 30 dg/min and a polydisperity index of at least 4.5,
  (d) from 100 to 250 parts by weight per 100 parts by weight of component (a) of a softener compatible with blocks B and B',
  (e) from 0.01 to 3 wt %, relative to the weight of the primary components (a) up to (e) of a solid chemical nucleating agent of the endothermic group in combination with a blowing agent, and optionally
  (f) one or more secondary components selected from PPO and/or any resins compatible with block copolymer component (a), antioxidants, UV-stabilizers, flame retardants, surface modifying agents and inorganic fillers.

2. The foamable compositions of claim 1, which comprise as components (a) and (b) at least one block copolymers of the general formulae

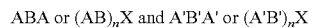
ABA or (AB)$_n$X and A'B'A' or (A'B')$_n$X respectively, wherein A, A' represent a poly(monovinyl arene) block and B, B' represent a hydrogenated poly (conjugated diene(s)) block, wherein n is an integer ≧2 and wherein X is the remainder of a coupling agent, wherein the blocks A, A' are different and the blocks A are larger than the blocks A'.

3. The foamable compositions of claim 2, wherein the block copolymer component (b) has the formula A'B'A' or (A'B')$_n$X, has a total apparent molecular weight in the range of from 80 to 160 kg/mole, wherein A' represents a substantially pure poly(styrene) block, each having a molecular weight in the range of from 5 to 15 kg/mole.

4. The foamable compositions of claim 2, wherein
  i) the block copolymer component (a) has the formula ABA or (AB)$_n$X, has a total apparent molecular weight in the range of from 250,000 to 600,000, wherein A represents a substantially pure poly(styrene) block and wherein the poly(styrene) block content in said block copolymer (a) is in the range of from 20 to 35 wt % and wherein B represents a hydrogenated poly(butadiene) block;
  ii) the weight ratio between the block copolymer components (a) and (b) is in the range of from 10 to 40 parts by weight of component (b) per 100 parts by weight of component (a);
  iii) component (e) is a single polymer or a mixture of polymers predominantly composed of propylene monomer or copolymer of predominantly propylene with a minor proportion of a different alkylene selected from ethylene or butylenes, having a melt flow rate in the range of between 2 and 15 dg/min at 230° C./2.16 kg, a Vicat softening temperature in the range of from 130 to 170° C., and occurs in a weight ratio of from 42 to 65 parts by weight of (c) per 100 parts by weight of (a);
  iv) component (d) is a paraffinic oil; and
  v) component (e) is selected from the group consisting of a mixture of NaHCO$_3$ with citric acid and a mixture of NaHCO$_3$ with sodium citrate, in amounts of from 0.5 to 1 wt %,
relative to the weight of components (a) up through (e).

5. The foamable compositions of claim 2, wherein i) the block copolymer component (b) has the formula A'B'A' or (A'B')$_n$X, has a total apparent molecular weight in the range of from 80 to 160 kg/mole, wherein A' represents a substantially pure poly(styrene) block, each having a molecular weight in the range of from 5 to 15 kg/mole;

ii) the weight ratio between the block copolymer components (a) and (b) is in the range of from 10 to 40 parts by weight of component (b) per 100 parts by weight of component (a);

iii) component (e) is a single polymer or a mixture of polymers predominantly composed of propylene monomer or copolymer of predominantly propylene with a minor proportion of a different alkylene selected from ethylene or butylenes, having a melt flow rate in the range of between 2 and 15 dg/min at 230° C./2.16 kg, a Vicat softening temperature in the range of from 130 to 170° C., and occurs in a weight ratio of from 42 to 65 parts by weight of (c) per 100 parts by weight of (a);

iv) component (d) is a paraffinic oil; and v) component (e) is selected from the group consisting of a mixture of NaHCO$_3$ with citric acid and a mixture of NaHCO$_3$ with sodium citrate, in amounts of from 0.5 to 1 wt %, relative to the weight of components (a) up through (e).

6. The foamable compositions of claim 1, wherein the weight ratio between the block copolymer components (a) and (b) is in the range of from 10 to 40 parts by weight of component (b) per 100 parts by weight of component (a).

7. The foamable compositions of claim 1, wherein component (c) is a single polymer or a mixture of polymers predominantly composed of propylene monomer or a copolymer of predominantly propylene with less than 25 wt % of a different alkylene selected from ethylene or butylenes.

8. The foamable compositions of claim 7, wherein component (c) has a melt flow range between 2 and 15 dg/min at 230° C./2.16 kg, a Vicat softening temperature in the range of from 130 to 170° C., and occurs in a weight ratio of from 42 to 65 parts by weight of (c) per 100 parts by weight of (a).

9. The foamable compositions of claim 8, wherein the component (c) shows a polydispersity index >5.

10. The foamable compositions of claim 1, wherein component (d) is a paraffinic oil.

11. The foamable compositions of claim 1, wherein component (e) is selected from the group consisting of a mixture of NaHCO$_3$ with citric acid and a mixture of NaHCO$_3$ with sodium citrate, in amounts of from 0.5 to 1 wt %, relative to the weight of components (a) up through (e).

12. Pre-blends of the foamable compositions according to claim 1, comprising either:

(A) a pre-blend comprising components (a), (c) and (d); or
(B) a pre-blend comprising components (b), (c) and/or (d).

13. Foamed articles comprising (a) 100 parts by weight of one or more selectively hydrogenated block copolymers, having at least two resinous blocks A of non-hydrogenated predominantly polymerized monovinyl arene, and a selectively hydrogenated elastomeric block B, wherein said block B prior to hydrogenation being predominantly a polymerized conjugated diene of polybutadiene, said block copolymer having a total apparent molecular weight from 250-600 kg/mole, and containing polymerized monovinyl arene blocks of true molecular weight of from 18 to 60 kg/mole, and said polymerized monovinyl arene content is in the range of from 20 to 35 wt %, b) 5 to 50 parts by weight per 100 parts by weight of component (a) of one or more selectively hydrogenated block copolymers having at least two resinous blocks A' of non-hydrogenated predominantly polymerized monovinyl arene, and an selectively hydrogenated elastomeric block B', wherein said block B' prior to hydrogenation has been derived from a polymerized conjugated diem or dienes as a major component which may be mixed with 25 or less wt. % of other copolymers, and said block copolymer having a total apparent molecular weight in the range of from 50 to 1.80 kg/mole, while the resinous blocks A' shown an true molecular weight in the range of from 3 to 20 kg/mole, c) from 42 to 80 parts by weight per 100 parts by weight of component (a) of a linear crystalline polymer comprising propylene as major component, with a Vicat softening temperature in the range of from 130° C. to 180° C. and a MFR in the range of from 0.5 to 30 dg/min and a polydisperity index of at least 4.5, (d) from 100 to 250 parts by weight per 100 parts by weight of component (a) of a softener compatible with blocks B and B', (e) from 0.01 to 3 wt %, relative to the weight of the primary components (a) up to (e) of a solid chemical nucleating agent of the endothermic group in combination with a blowing agent, and optionally (f) one or more secondary components selected from PPO and/or any resins compatible with block copolymer component (a), antioxidants, UV-stabilizers, flame retardants, surface modifying agents and inorganic fillers.

* * * * *